United States Patent [19]

Stevenson

[11] 4,324,133
[45] Apr. 13, 1982

[54] TORQUE MEASURING DEVICE

[75] Inventor: David J. Stevenson, Arcadia, Calif.

[73] Assignee: Clayton Manufacturing Company, El Monte, Calif.

[21] Appl. No.: 150,625

[22] Filed: May 16, 1980

[51] Int. Cl.³ .............................................. G01L 3/02
[52] U.S. Cl. .................................... 73/117; 73/862.09
[58] Field of Search .................... 73/117, 133 R, 134, 73/862, 862.09; 308/2 R

[56] References Cited

U.S. PATENT DOCUMENTS

| | | | |
|---|---|---|---|
| 1,966,603 | 1/1934 | Walker | 73/117 |
| 2,130,900 | 9/1938 | Presbrey | 73/117 |
| 3,149,420 | 9/1964 | Lebow | 33/147 |
| 3,213,679 | 10/1965 | Lebow | 73/136 |
| 3,289,471 | 12/1966 | Maxwell | 73/117 |
| 3,377,849 | 4/1968 | Lebow | 73/134 |
| 3,600,942 | 8/1971 | Brendel | 73/141 |
| 4,023,404 | 5/1977 | Brendel | 73/133 R |
| 4,179,923 | 12/1979 | Dodt | 73/134 |
| 4,215,569 | 8/1980 | Bonomo et al. | 73/134 |

OTHER PUBLICATIONS

Brochure from Froude Engineering Ltd., 2 pages dated Jun. 1977.
Brochure from Lebow Associates, Inc. of Troy, Michigan, The Trunnion Mounted Dynamometer, 1 page, no date.

*Primary Examiner*—Jerry W. Myracle
*Attorney, Agent, or Firm*—Jackson, Jones & Price

[57] ABSTRACT

A torque measuring device is disclosed wherein a torque of a rotating member rotating about an axis is measured. The device includes a support member which is attached to a fixed object such as a stationary frame by at least two linkage arms. Each linkage arm is pivotably attached at a first point of attachment to the fixed object and at a second point of attachment to the support member. The relative positioning of the rotating member, the support member, and the linkage arms is such that geometrical lines interconnecting the respective first and second points of attachment of each linkage arm substantially intersect the axis of the rotating member. The rotating member is in an operative relationship with the support member so that the rotating member during its rotation imparts a force to the support member, which attempts to rotate the support member.

An instantaneous center of rotation of the support member coincides with the axis of rotation of the rotating member. A load cell or like force measuring device is interposed between the support member and the fixed object to measure the force imparted to the support member by the rotating member. The load cell and the linkage arms prevent substantial displacement of the support member even though the measured force may vary substantially. From the measured force and a known and constant lever arm of the force the torque of the rotating member is readily calculated.

30 Claims, 10 Drawing Figures

TORQUE MEASURING DEVICE

BACKGROUND OF THE INVENTION

1. Field of the Invention

The present invention is directed to an improved torque measuring device, and particularly to a torque measuring device which is very well adapted for testing vehicles in association with chassis dynamometers and the like.

2. Brief Description of the Prior Art

A conventional method and device for measuring the torque output of a rotating shaft involves the use of an "in-line" torque meter assembly which has a member rotating together with the shaft. The member suffers a torsional deformation which is proportional to the torque output of the shaft. A suitable transducer is operatively coupled to the rotating member and sends off electric or radio signals proportional to the torsional deformation of the member.

In dynamometers of the type used in testing automotive engines, and particularly vehicles, torque is usually measured in the following manner. A stator of the dynamometer is supported upon ball bearings or oil floated trunnion bearings for rotation in coaxial relationship with a dynamometer rotor which is driven by the drive wheels of the vehicle. The reaction torque of the stator is then measured by strain gauges, load cells or like devices. The torque meters of this type are usually termed in the prior art, reaction torque type torque meters.

The above summarized prior art devices suffer from many disadvantages. For example, rotating in-line type torque meter assemblies require a radio transmitter or suitable slip rings and brushes to transmit the radio or electric signals which are proportional to the torsional deformation of the rotating member. In the reaction-torque type torque meters mounting of the stators requires large, expensive heavy-duty ball bearings which introduce frictional forces unfavorably influencing the torque measurements. Oil floated trunnion mounting of the stator of reaction torque type torque meters, on the other hand, is rather expensive.

Accordingly, the present invention is directed to a torque meter which overcomes many of the disadvantages of the prior art, is relatively economical to manufacture, and in certain embodiments is capable of directly measuring the torque output of a rotating shaft without the use of an in-line rotating member.

SUMMARY OF THE INVENTION

It is an object of the present invention to provide an improved torque measuring device which accurately measures the torque output of a rotating shaft without the use of an in-line rotating member.

It is another object of the present invention to provide an improved torque measuring device which accurately measures the torque exerted by a rotating inertia wheel on a stationary assembly which brakes the inertia wheel.

It is still another object of the present invention to provide an improved torque measuring device which is well adapted for use in combination with a chassis dynamometer and which accurately measures the torque transferred into rollers of the dynamometer from driving wheels of a vehicle.

It is yet another object of the present invention to provide an improved torque measuring device which is well adapted for use in combination with a chassis dynameter and inertia wheel assembly, and which accurately measures the torque transferred from the driving wheels of the vehicle to rollers of the dynamometer, said torque being a sum of the torques absorbed in a power absorption unit and the torque required to accelerate the inertia wheel.

It is a still further object of the present invention to provide an improved torque measuring device which is well adapted for use in combination with a chassis dynamometer having spline assembly type coupling to a power absorption unit and which is capable of eliminating of minimizing the influence of axially oriented spline friction forces on the measured torque.

These and other objects and advantages are attained by a torque measuring device which combines a member rotating about an axis and a support member relative to which the rotating member is rotatably mounted in a relationship wherein the rotating member imparts a force upon the support member during its rotation.

The support member is supported relative to a fixed object such as the ground by at least two linkage arms. Each linkage arm is pivotably mounted to the fixed object as a respective first point of mounting, and to the support member at a respective second point of mounting. The rotating member, the support member and the linkage arms are positioned in such a manner relative to one another that a geometrical line drawn between the first and second points of mounting of each linkage arm substantially intersects the axis of rotation of the rotating member. As a result of this positioning of the rotating member, of the support member and the linkage arms, the axis of rotation of the rotating member becomes a center of rotation about which the rotating member attempts to rotate the support member.

A force measuring device, such as a load cell, is mounted between the support member and the fixed object. The force measuring device prevents the support member from significantly moving in any direction and measures the force imparted to the support member by the rotating member. The torque of the rotating member is readily calculated from the measured force, and from the lever arm of the force which is constant and readily ascertainable in the device.

The objects and features of the present invention are set forth in the appended claims. The present invention may be best understood by reference to the following description, taken in connection with the accompanying drawings in which like numerals indicate like parts.

DESCRIPTION OF THE PREFERRED EMBODIMENTS

The following specification taken in conjunction with the drawings set forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Figure 1:
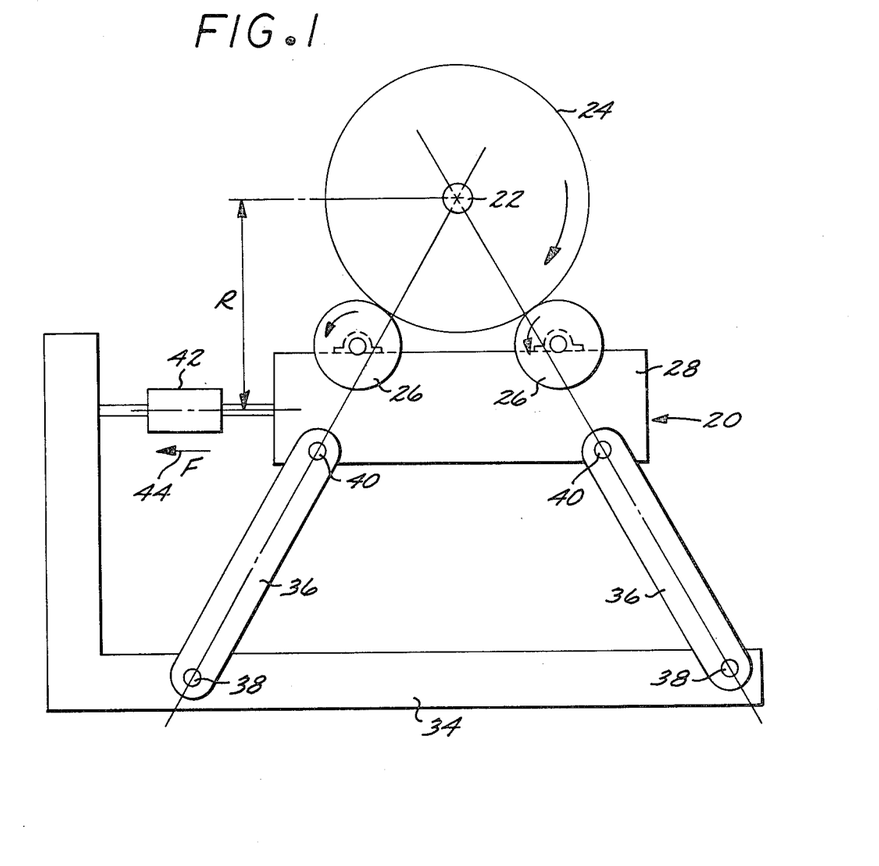
FIG. 1 is a side view schematically illustrating a first preferred embodiment of the novel torque measuring device of the present invention.

Referring now to the drawing Figures and particularly to the schematic view of FIG. 1, a first preferred embodiment 20 of the novel torque measuring device of the present invention is disclosed. It should be understood at the outset of the present description that the several embodiments of the torque measuring device of the present invention are shown on FIGS. 1-5 in a schematic manner only, so that the principles of construction and operation of these devices is readily illustrated without showing unnecessary detail.

The first preferred embodiment 20 of the torque measuring device of the present invention is specifically adapted for measuring the torque output of a rotating axle such as the rotating axle 22 of the driving wheel 24 of a vehicle (not shown). The driving wheel 24 of the vehicle (not shown) is positioned between two rollers 26 which are mounted to a suitable support platform or support member 28. The rollers 26 are driven by the rotating driving wheel 24, and power transmitted to the rollers 26 from the driving wheel 24 is absorbed by a suitable device such as a power absorbing unit 30. The power absorbing unit 30 and a rotating shaft which connects the same to the rollers 26 are shown on FIGS. 2, 3, 4, 6, and 7. As an alternative to the power absorbing unit 30, the rollers 26 may be equipped with brakes (not shown).

The support platform or support member 28, is mounted to a stationary frame 34 through linkage arms 36, each of which is pivotably attached to the support platform or member 28 and to the stationary frame 34 as well. More specifically, each linkage arm 36 has a first pivotable point of attachment 38 to the stationary frame 34, and a second pivotable point of attachment 40 to the support member 28.

The number of linkage arms 36 is not critical for the purpose of practicing the present invention, although in all preferred embodiments four linkage arms 36 are provided, two of which are discernible on FIG. 1.

It is a critical feature of the present invention that the relative positioning of the linkage arms 36, the support member 28 and of the rotating axle 22 is such that geometrical lines interconnecting the respective first and second pivotable points of attachment 38 and 40 of the linkage arms 36 substantially intersect the rotating axle 22.

A suitable force measuring device, such as a conventional load cell 42 is mounted between the support member 28 and the stationary frame 34. The nature and construction of the load cell 42 is not critical except to the extent that it must be capable of measuring varying forces without allowing substantial displacement of the support member 28 relative to the stationary frame 34. In other words, while the novel torque measuring device of the present invention is in operation, alignment of the support member 28 relative to the rotating axle 22 must remain such that the geometrical lines interconnecting the respective first and second pivotable points of attachment 38 and 40 of the linkage arms 36 substantially intersect the rotating axle 22 regardless of the force on the load cell 42.

It is readily apparent from the above description and from an inspection of FIG. 1 that as the driving wheel 24 rotates, and drives the rollers 26 against a retarding force such as the power absorption unit 30 of brakes (not shown), a force and a torque is imparted to the rollers 26 and therefore to the support member 28. The imparted force attempts to rotate the support member 28 about a center of rotation. Due to the particular mounting of the support member 28 this center of rotation coincides with the rotating axle 22. Forces loading the bearings which comprise the pivotable points of attachments 38 and 40 of the linkage arms 36 have a substantially zero lever arm relative to the center of rotation of the support member 28 and therefore result in no torque. The lever arm of the force 44 measured by the load cell 42, on the other hand, is a known design parameter of the device and is indicated as R on FIG. 1. From the measured force and the known lever arm R, the torque output of the rotating axle 22 is readily calculated. Radial forces through the center of rotation and torque in a plane parallel to the axle 22 are not measured by the load cell 42.

It should be noted that if the driving wheel 24 comprises a tire of the vehicle (not shown) then the torque measured in the above described manner includes the torque required to continuously flex the walls of the tire as they engage and frictionally drive the rollers 26. It is well known in the art that measuring the torque output of a rotating axle of any machine, and particularly of the rotating wheel axle of a vehicle has, until the present invention, presented a rather difficult problem. This problem, however, is readily solved by the above described first preferred embodiment of the present invention.

Figure 2:
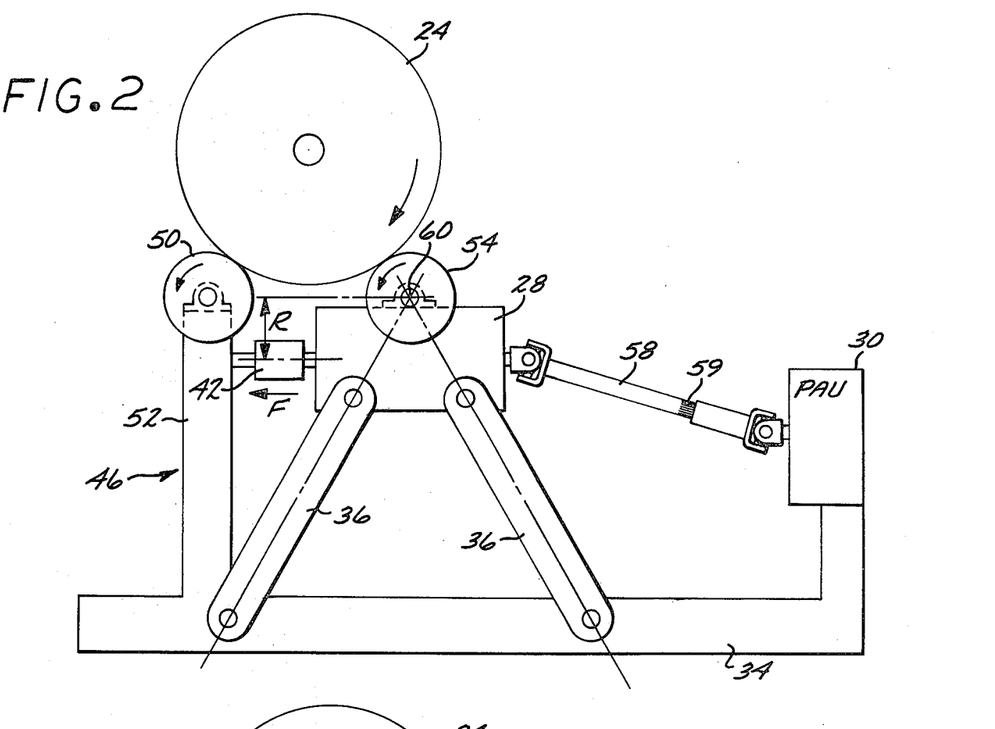
FIG. 2 is a side view schematically illustrating a second preferred embodiment of the novel torque measuring device of the present invention.

Referring now to the schematic view of FIG. 2, a second preferred embodiment 46 of the novel torque measuring device is shown in combination with a conventional power absorbing unit 30. The second preferred embodiment 46 is constructed in such a manner that the entire combination comprises an improved chassis dynamometer. Thus, the second preferred embodiment 46 has a stationary frame 34 and a pair of idle rollers 50 only one of which is shown on the side view of FIG. 2. The idle rollers 50 are supported by and rotatably mounted to a support column 52 which is part of the stationary frame 34.

A pair of driven rollers 54, only one of which is shown, is rotatably mounted to a support platform or support member 28 which includes a transmission assembly or gear box. The transmission assembly or gear box is not specifically shown on FIG. 2 although it is readily discernible on FIGS. 6 and 7.

The idle rollers 50 and the driven rollers 54 are parallel disposed relative to one another so that on idle roller 50 together with one driven roller 54 forms a cradle for the receipt of one driving wheel 24 of the vehicle (not shown). The driven rollers 54 are connected through the transmission assembly and a rotating shaft 58 to the power absorption unit 30 so that the driving wheel 24 and therefore the engine (not shown) of the vehicle (not shown) works against an adjustable load of the power absorption unit 30. A spline assembly 59 of the type well known in the mechanical arts is incorporated in the rotating shaft 58, whereby vibrations and inadvertent displacements in the direction of the longitudinal axis of the shaft 58 are accommodated.

In the second preferred embodiment 46, as in the first preferred embodiment 20, the support platform or support member 28 is mounted to the stationary frame 34 through four linkage arms 36. Only two of the linkage arms are shown on FIG. 2. Each of the linkage arms 36 is pivotably attached to the stationary frame 34 and to the support member 28 in such a manner that the geometrical lines respectively interconnecting the points of attachments of each linkage arm 36 substantially intersect the axes of rotation 60 of the driven rollers 54. As is apparent from an inspection of FIG. 2, the axes 60 of rotation of the two driven rollers 54 are parallel and colinear with one another.

A load cell 42 is mounted between the column 52 of the stationary frame 34 and the support member 28. As in the first preferred embodiment 20, the nature of the load cell 42 is not critical for as long as it prevents substantial displacement of the support member 28 relative to the stationary frame 34 regardless of the magnitude of a varying force exerted upon the load cell 42. In other words, during operation of the second preferred embodiment 46 of the present invention, as during operation of the first preferred embodiment 20, the instantaneous center of rotation of the support member 28 must substantially coincide with the center of rotation of the rotating member a torque output of which is measured.

Thus, as the driving wheels 24 rotate and drive the driven rollers 54 against the resistance offered by the power absorbtion unit 30, the driven rollers 54 impart a force and a torque to the support member 28. The imparted force attempts to rotate the support member 28 about its instantaneous center of rotation which coincides with the colinear axes 60 of the driven rollers 54. The imparted force is measured by the load cell 42, and from a known, constant lever arm of the measured force relative to the axes 60 of rotation of the driven rollers 54 the torque of the driven rollers 54 is readily calculated. The torque obtained in this manner is substantially equal to the torque transferred from the driving wheels 24 to the driven rollers 54 at the interfaces of driving wheels 24 with the driven rollers 54. Torque in a plane parallel to axes 60 of the driven rollers 54 is not measured by the load cell 42.

Figure 3:
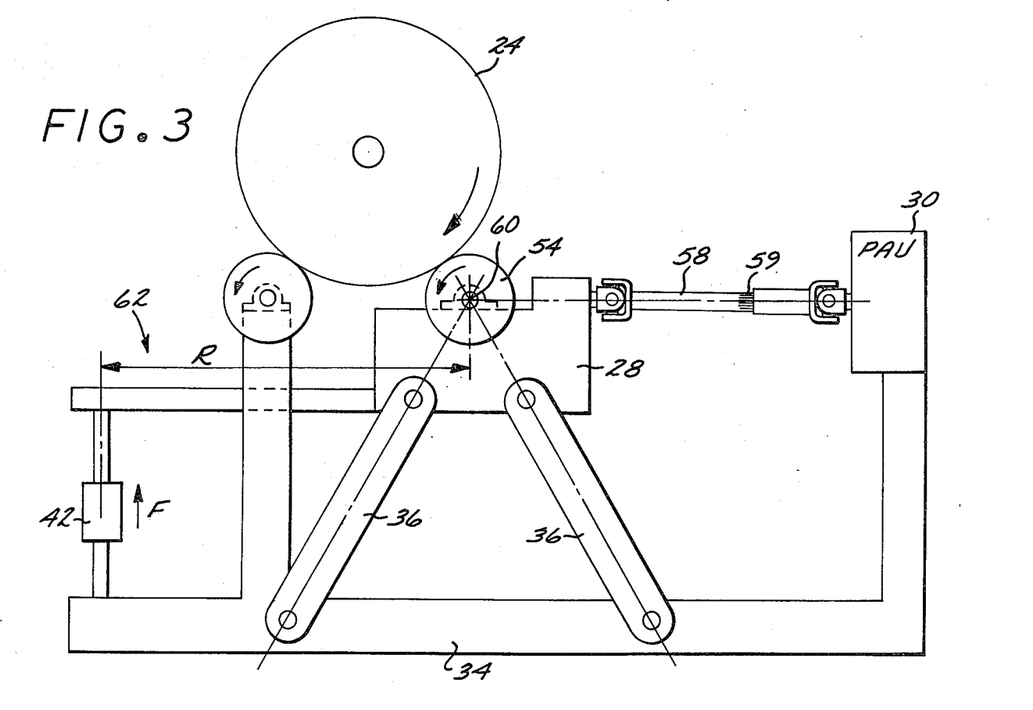
FIG. 3 is a side view schematically illustrating a third preferred embodiment of the novel torque measuring device of the present invention.

Referring now to FIG. 3, a third preferred embodiment 62 of the novel torque measuring device of the present invention is disclosed. The third preferred embodiment 62 is also combined with a chassis dynamometer, and is adapted for measuring the torque transferred from the two driving wheels 24 of a motor vehicle (not shown) to a pair of driven rollers 54 which comprise part of the chassis dynamometer. A significant difference between the second preferred embodiment 46 and the third preferred embodiment 62 is in the manner of coupling the transmission assembly or gear box (not specifically shown on FIG. 3) to the power absorbing unit 30. In the third preferred embodiment 62 the rotating shaft 58 which connects the transmission assembly with the power absorbing unit 30 is mounted so that its longitudinal axis substantially intersects the colinear axes 60 of rotation of the drive rollers 54.

As it was briefly stated above, a spline assembly 59 is customarily incorporated in the rotating shaft 58. This is true even in conventional, prior art chassis dynamometers which do not possess the several novel features of the torque measuring device of the present invention. The spline assembly 59 is necessary to accomodate inadvertent dislocations and vibrations which occur in a direction parallel with the longitudinal axis of the rotating shaft 58.

It is well known however in the mechanical arts that the spline assembly 59 itself may create significant forces which are substantially parallel with the longitudinal axis of the rotating shaft 58. These forces are termed "spline friction forces" for the purposes of the present description. In the third preferred embodiment 62, the spline friction forces comprise force vectors which substantially intersect with the axes 60 of rotation of the driven rollers 54, and therefore have a substantially zero lever arm relative thereto. Consequently, in the third preferred embodiment 62 the spline friction forces are not measured and do not affect the calculated torque values.

Another feature of the third preferred embodiment 62 which distinguishes it from the second preferred embodiment 46 is in the manner the load cell 42 is positioned relative to the support platform or support member 28 and the stationary frame 34. In the third preferred embodiment 62 the load cell 42 is positioned to measure substantially vertical force vectors while in the second preferred embodiment 46 the load cell 42 is positioned to measure substantially horizontal force vectors. It is readily apparent, however from the above description and from an inspection of the drawing figures, that the positioning of the load cell 42 is not critical. This is because the torque transmitted from the rotating driving wheel 24 attempts to rotate the entire support member 28 about the axes 60 of rotation of the driven rollers 54 with a force which is measured by the load cell 42. The known and constant radius or lever arm of the force measured by the load cell 42 in the third preferred embodiment 62 is indicated by the letter R on FIG. 3.

Figure 4:
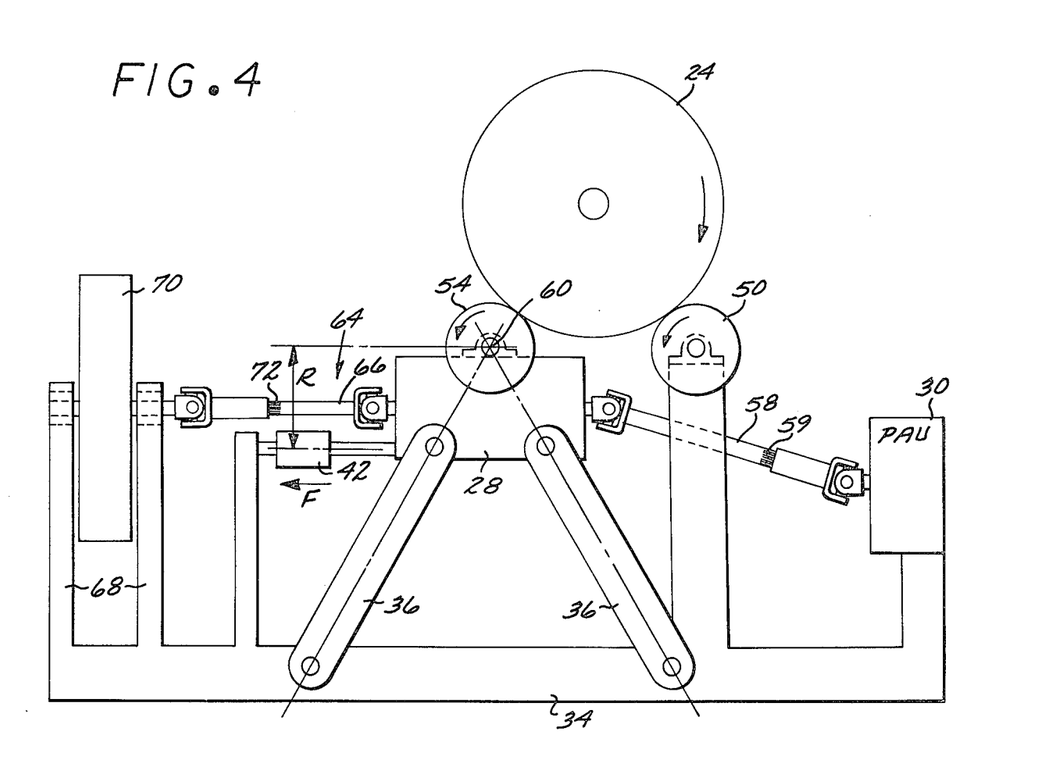
FIG. 4 is a side view schematically illustrating a fourth preferred embodiment of the novel torque measuring device of the present invention.

Referring now to FIG. 4, a fourth preferred embodiment 64 of the novel torque measuring device of the present invention is disclosed. The fourth preferred embodiment 64 is identical in most respects to the hereinbefore described second preferred embodiment 46. Therefore it is described only to the extent necessary to illustrate and explain features which distinguish it from the second preferred embodiment 46.

Thus, in the fourth preferred embodiment 64 a second rotating shaft 66 is coupled to and driven by the transmission assembly or gear box (not specifically shown on FIG. 4), which is itself driven by the driving wheels 24 of the vehicle (not shown) through a pair of driven rollers 54. A pair of mounting posts 68 attached to a stationary frame 34 support an inertia wheel 70. The inertia wheel 70 is driven by the second rotating shaft 66. A suitable second spline assembly 72 is interposed on the second rotating shaft 66 between the inertia wheel 70 and the transmission assembly. A support member 28 to which the driven rollers 54 and the transmission assembly are mounted is attached to the stationary frame 34 through four linkage arms 36 in substantially the same manner as the support member 28 of the second preferred embodiment 46 is attached. The load cell 42 is disposed between a member 74 of the stationary frame 34 and the support member 28.

It is readily apparent from the above that in the fourth preferred embodiment 64 the rotating driving wheels 24 of the vehicle (not shown) transmit torque to the driven rollers 54 not only to overcome the resistance of the power absorbing unit 30, but also to rotate and if desired to accelerate, the inertia wheel 70. The torque measured by the load cell 42 is substantially the total torque transferred from the driving wheels 24 to the driven rollers 54.

In other embodiments (not shown) of the combination shown on FIG. 4, the first and second rotating shafts 58 and 66 may be mounted so that their respective longitudinal axes substantially intersect the colinear axes of rotation 60 of the driven rollers 54. In this case spline friction forces have a substantially zero lever arm relative to the instantaneous center of rotation of the support member 28 and therefore do not influence the measured torque.

Figure 5:
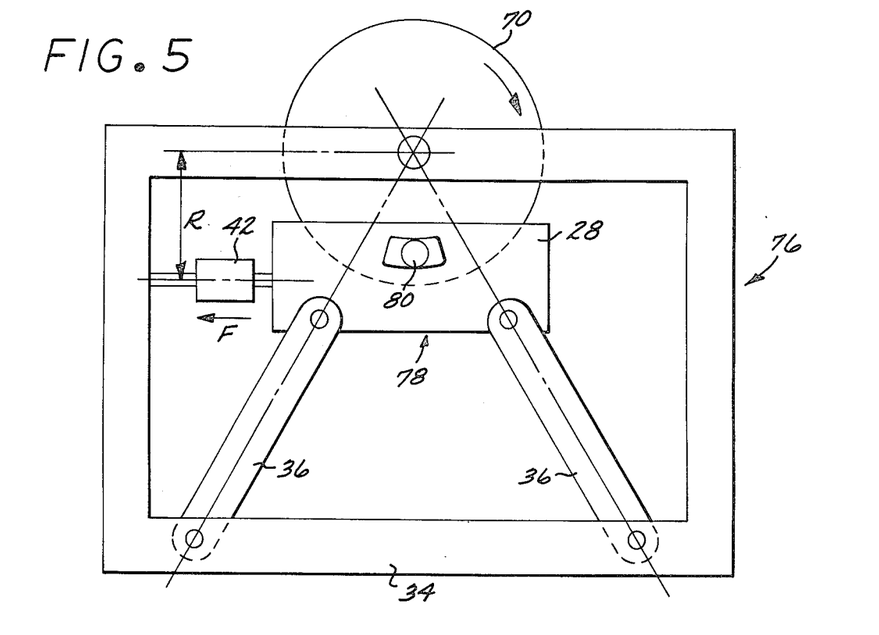
FIG. 5 is a side view schematically illustrating a fifth preferred embodiment of the novel torque measuring device of the present invention.

A fifth preferred embodiment 76 of the novel torque measuring device of the present invention is disclosed with reference to the schematic view of FIG. 5. In the fifth preferred embodiment 76 the novel torque measuring device is utilized for measuring the torque exerted by a rotating inertia wheel 70 upon a brake assembly 78 which resists or attempts to halt its rotation. The inertia wheel 70, in turn, is driven by a prime mover (not shown) such as a vehicle engine through a suitable transmission assembly (not shown on FIG. 5).

The inertia wheel 70 is rotatably mounted to a stationary frame 34. The brake assembly 78 includes a pair of brake pucks 80 which come into frictional engagement with the inertia wheel 70 when the brake assembly 78 is applied. The brake pucks 80 are mounted to a suitable support member 28 which itself is attached to the stationary frame 34 through four pivotably mounted linkage arms 36. Only one of the brake pucks 80 and two of the linkage arms 36 are shown on FIG. 5.

As in the hereinbefore described preferred embodiments, an important feature of the fifth embodiment of the present invention lies in the fact that the support member 28 is mounted to the stationary frame 34 in such a manner that the instantaneous center of rotation of the support member 28 substantially coincides with the axis of rotation of the rotating member, in this case the inertia wheel 70. As the brake assembly 78 is applied, the inertia wheel 70 imparts a force and a torque upon the support member 28. Thus, in the fifth preferred embodiment 76 the torque imparted to the support member 28 attempts to rotate the support member 28 about the axis of the inertia wheel 70.

A load cell 42 is positioned between the stationary frame 34 and the support member 28. As in the hereinbefore described preferred embodiments, the load cell 42 measures force without allowing significant dislocation of the support member 28 relative to the stationary frame 34. A known and constant radius or lever arm at which the measured force is acting relative to the instantaneous center of rotation of the support member 28 is indicated with the letter R on FIG. 5.

It should be readily apparent from the above description that the fifth embodiment 76 of the present invention is capable of accurately measuring the torque imparted to the support member 28 regardless of the exact location where the brake pucks 80 come into frictional engagement with the inertia wheel 70.

Referring now to FIGS. 6, 7, 8, 9 and 10, a sixth preferred embodiment 84 of the novel torque measuring device of the present invention is disclosed in detail as it is used in combination with a chassis dynamometer including a conventional hydrokynetic power absorbtion unit.

The combination of the sixth preferred embodiment 84 is particularly adapted for testing vehicles such as trucks (not shown) having tandemly disposed two pairs of driving wheels. As is best shown on FIG. 7, the combination is placed into a suitable pit or chamber 86 in the ground of floor of a building (not shown) wherein the testing of vehicles is conducted.

The combination includes a stationary frame 34 which is fastened to a concrete or like floor 88 of the pit 86. The stationary frame 34 is constructed of heavy duty iron of I or like cross section and is similar in many respects to stationary frames used for mounting conventional, prior art chassis dynamometers in a chamber or pit of a vehicle testing facility.

Generally speaking, those components of the novel combination of the sixth preferred embodiment 84 of the present invention which are identical or similar in construction with like components of conventional chassis dynamometers are not described here in detail. For the construction of conventional chassis dynamometers and particularly of hydrokynetic power absorbtion units reference is made to U.S. Pat. Nos. 2,870,875; 3,938,377; 2,287,084; and 3,942,363, the specifications of which are hereby expressly incorporated by reference. It should be expressly understood, that the present invention is not limited by the specific nature of the power absorbtion unit used.

Figure 6:
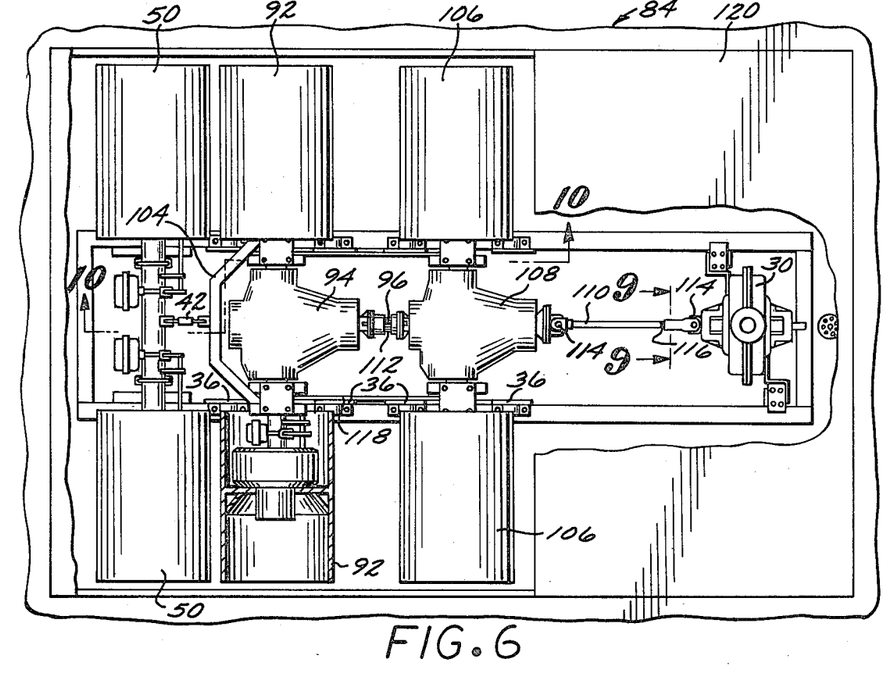
FIG. 6 is a top view of a chassis dynameter in combination with a sixth preferred embodiment of the novel torque measuring device of the present invention.
Figures 7, 8, 9:
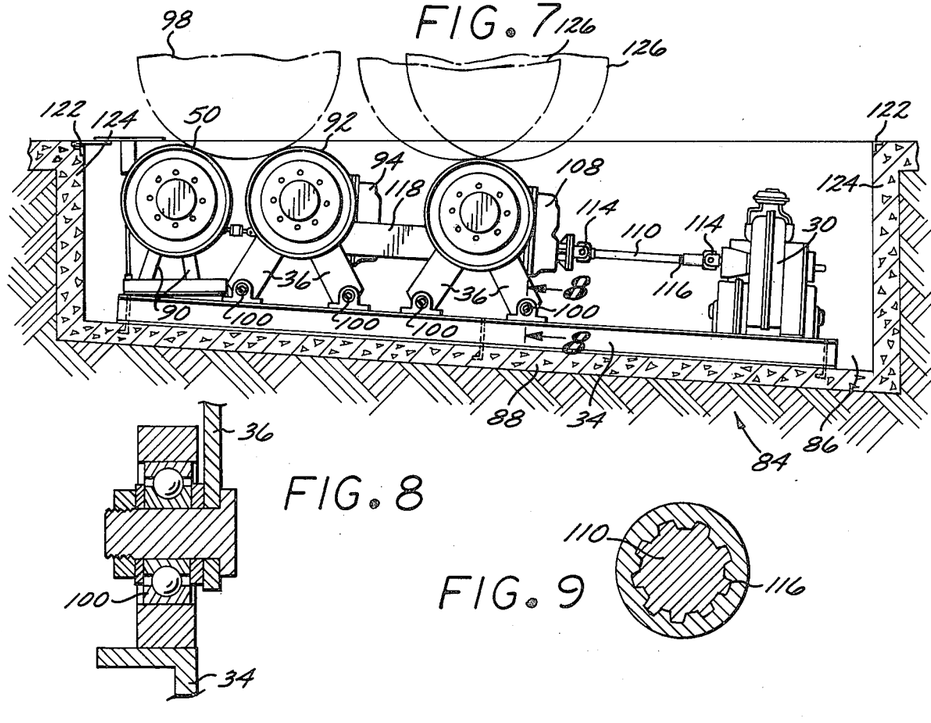
FIG. 7 is a side view of the combination shown on FIG. 6.
FIG. 8 is a cross-sectional view taken on lines 8—8 of FIG. 7.
FIG. 9 is a cross-sectional view taken on lines 9—9 of FIG. 6.

Referring now principally to FIGS. 6 and 7, attachment of a hydrokynetic power absorbtion unit 30 to the stationary frame 34 toward one end of the pit 86 is shown. The floor 88 of the pit 86 slants downwardly towards the end wherein the power absorbtion unit 30 is placed. This facilitates construction of the entire combination so that vehicle (not shown) is maintained in a substantially level position during testing. It also facilitates removal of water or other liquids which may occasionally accumulate in the pit 86.

Three pairs of rollers are mounted to the stationary frame 34. A first, and rearmost pair of the rollers comprise idle rollers 50. The idle rollers 50 are supported by two support braces 90 on each lateral side of the stationary frame 34. The support braces 90 are rigidly attached to the stationary frame 34 and the idle rollers 50 are mounted to rotate freely relative to the support braces 90.

An intermediate pair of rollers comprise driven rollers 92. These are disposed with their respective axes of rotation being colinear with one another and parallel with the axes of rotation of the idle rollers 50. The intermediate driven rollers 92 are supported by and connected to a first transmission assembly 94. The construction of the intermediate driven rollers 92 and of the first transmission assembly 94 is conventional. For this reason it is sufficient to state that the intermediate driven rollers 92 drive a first rotating shaft 96 through the first transmission assembly 94. As is described in more detail below, the first rotating shaft 96 indirectly interconnects the first transmission assembly 94 with the power absorbing unit 30.

Each of the intermediate drive rollers 92 together with a respective idle roller 50 forms a cradle for the receipt of one of the rear drive wheels of the vehicle (not shown) to be tested. Only one of the rear drive wheels of the vehicle (not shown) is schematically shown on FIG. 7, bearing the reference numeral 98.

In accordance with the above disclosed principles of the present invention, the mounting of the first transmission assembly 94 is through a plurality of linkage arms 36. The linkage arms 36 render the first transmission assembly 94 and the intermediate drive rollers 92 pivotable about an axis which coincides with the colinear rotational axes of the intermediate drive rollers 92. This is accomplished by mounting each of the linkage arms 36 through a ball or roller bearing 100 to the stationary frame 34, and through another ball or roller bearing 100 to a plate 102 which is part of the first transmission assembly. The bearings 100 of each linkage arm 36 are, in accordance with the present invention, positioned in such a manner that the geometrical lines interconnecting the centers of the bearings 100 substantially intersect the axes of rotation of the intermediate drive rollers 92.

In the sixth preferred embodiment 84, four linkage arms 36 are provided to support the first transmission assembly 94 together with the intermediate drive rollers 92, with two linkage arms 36 being located on each lateral side of the stationary frame 34. The mounting of the linkage arms 36 to the stationary frame 34 through a respective ball bearing 100 is best shown on the cross-sectional view of FIG. 8, while mounting of the same to the plate 102 of the first transmission assembly 94 is best shown on FIG. 10.

A member 104 being comprised of three channel irons joined to one another rigidly interconnects the two plates 102 on each side of the first transmission assembly 94. The member 104, which is best shown on FIG. 6, transmits a force to be measured to a load cell 42.

A second pair of driven rollers 106 are positioned forwardly of the intermediate driven rollers 92. The second driven rollers 106 have colinear rotational axes with one another and are disposed parallel with the intermediate driven rollers 92. The second driven rollers 106 are supported by a second transmission assembly 108 and drive a second rotating shaft 110. The first and second transmission assemblies 94 and 108 function as speed increasing drives and drive the respective first and second rotating shafts 96 and 110 at a significantly faster speed than the rotating intermediate and second driven rollers 92 and 106.

The first and second rotating shafts 96 and 110 are fixedly coupled to one another within the second transmission assembly 108 so that they rotate at the same speed. In order to accomodate axial dislocations and vibrations, a first spline assembly 112 is provided on the first rotating shaft 96. The second rotating shaft 110 is connected to the power absorbing unit 30 through the intermediacy of two universal joints 114 and a second spline assembly 116.

Mounting of the second pair of driven rollers 106 and of the second transmission assembly 108 to the stationary frame 34 is also accomplished by four linkage arms 36. Since this mounting is substantially the same as mounting of the intermediate drive rollers 92 and of the first transmission assembly 94 it need not be described here in detail. It is sufficient to state that an instantaneous center of rotation of the second drive rollers 106 and of the second transmission assembly 108 substantially coincides with the colinear axes of rotation of the second pair of drive rollers 106.

Figure 10:
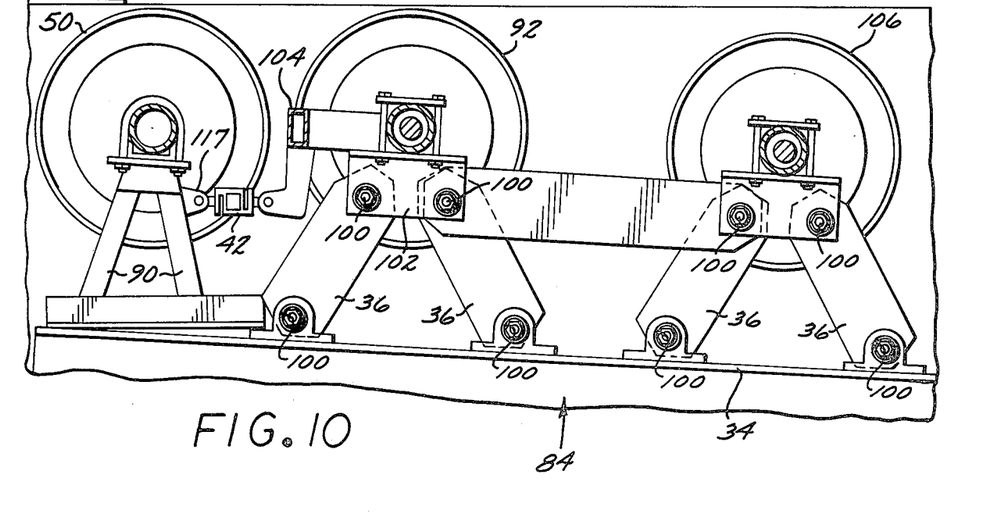
FIG. 10 is a cross-sectional view taken on lines 10—10 of FIG. 6.

A connecting member or plate 118 shown on FIGS. 6, 7, and 10 is provided on either side of the first and second transmission assemblies 94 and 108 to rigidly interconnect the two and to transfer the force to be measured by the load cell 42.

The load cell 42 is mounted between the member 104 and a support rod 117 of the idle rollers 50. The support rod 117 is itself rigidly connected to the stationary frame 34 through the support braces 90.

A cover plate 120, shown on FIG. 6, covers the entire pit or chamber 86 so that only the rollers 50, 92, 106 are exposed and are accessible for contact with wheels of the vehicle (not shown) to be tested.

In the sixth preferred embodiment 84 of the present invention a braking system is associated with the intermediate and second pair of driven rollers 92 and 106 so that if so desired the drive rollers 92 and 106 can be braked, independently of the hydrokynetic power absorbtion unit 30. Any torque exerted by the driving wheels of the vehicle (not shown) against the load of the braking system of the driven rollers 42 and 106 is measured by the load cell 42. Because the braking system is conventional in construction, it is not described in detail.

Having described the principal structural components of the sixth preferred embodiment of the novel torque measuring device of the present invention its operation is explained as follows.

A motor vehicle (not shown) such as an automobile or truck is driven upon the novel torque—measuring—device—chassis—dynamometer with its rear driving wheels engaging the idle rollers 50 and the intermediate driven rollers 92. Thus, the front of the automobile (not shown) or cab (not shown) of the truck (not shown) faces forwardly toward the end of the pit 86 which contains the power absorbing unit 30. One rear driving wheel of the automobile or truck (not shown) is schematically shown on FIG. 7 and bears the reference numeral 98.

In the event the motor vehicle is a truck (not shown) having tandem axles with double pairs of driving wheels, the forward pair of the driving wheels engage the second pair of driven rollers 106. One of the forward pair of driving wheels of a truck (not shown) is schematically shown on FIG. 7 as 126.

In this regard it is noted that the distance between the intermediate driven rollers 92 and second pair of driven rollers 106 is specifically designed in such a manner that the torque—measuring—device—chassis—dynamometer will readily accomodate trucks having tandem driving wheels at a 47 through 57 inch distance from one another. As is commonly known by those skilled in the art, trucks having such a drive axle center line spacing are in common usage in the automotive and transportation industry.

The weight of the vehicle such as the truck is supported partially by the idle rollers 50 and partially by the driven rollers 92 and 106. The entire torque—measuring—device—chassis—dynamometer is designed in such a manner that force vectors representing the weight of the truck on the intermediate pair of driven rollers 92 and on the second pair of driven rollers 106 substantially intersect the axes of rotation of the corresponding pair of driven rollers. Therefore the weight of the truck (not shown) results in only a very small or no measurable force on the load cell 42. The load cell 42, associated electric circuits (not shown) and display unit (not shown) can be adapted to be adjustable to display zero torque when the automobile or truck is standing with its driving wheels at rest on the novel torque—measuring—device—chassis—dynamometer.

As the driving wheels of the vehicle or truck are rotated by the power of its engine against the resistance of the power absorbing unit 30, a torque is developed on the intermediate pair of driven rollers 92. If the driving wheels of the truck engage the second pair of driven rollers 106 also then a torque is developed on the second pair of driven rollers 106 as well. The developed torque attempts to rotate each pair of driven rollers 92 and 106 and the corresponding transmission assembly 94 and 108 about the respective axis of rotation of the driven rollers. The force corresponding to the torque on the second transmission assembly 108 is transmitted by the rigid connecting plates 118 to the first transmission assembly 94. From the first transmission assembly 94 the total force is transmitted to the load cell 42 which is capable of measuring a varying force without allowing any significant displacement of the transmission assemblies 94 and 108 relative to the stationary frame 34. In this regard it is noted that piezo type load cells which function without practically any lateral displacement in response to a varying force, are particularly suitable for use in the present invention. From the measured force and the known lever arm of the force, the total torque exerted by the driving wheels of the vehicle at the wheel or tire and driven roller interfaces is readily calculated. The display unit (not shown) connected to the load cell 42 may be designed to display, if so desired, the calculated torque rather than the measured force.

The several advantages of the hereinbefore described novel torque measuring device of the present invention include its relatively low cost, and its ability to accurately measure torque, particularly the torque output of a wheel axle.

Several modifications of the novel torque measuring device may become readily apparent to those skilled in the art in light of the above disclosed generic principles. A particularly apparent modification is one wherein the novel torque measuring device is used to continuously monitor the torque of a rotating shaft, and is connected to a suitable control circuit to eliminate the possibility of overstressing the shaft. In light of the foregoing, the scope of the present invention should be interpreted solely from the following claims.

What is claimed is:

1. In a device for measuring torque the combination which comprises:
   a roller rotating about an axis;
   a support member relative to which the roller is rotatably mounted in a relationship wherein the roller imparts a force upon the support member;
   support means for supporting the support member relative to a fixed object such as the ground, said support means including at least two linkage arms connecting the support means to the fixed object, each linkage are being pivotably mounted to the fixed object at a first point of mounting and being pivotably mounted to the support member at a second point of mounting and disposed in such a manner that a geometrical line drawn between the first and second points of mounting of each linkage arm substantially intersects the axis of rotation of the roller;
   power absorbing means operatively connected to the support member for absorbing rotational power of the roller, and
   force measuring means mounted between the support member and the fixed object for measuring the force imparted by the roller to the support member, said force having a perdetermined known lever arm relative to the axis of rotation of the roller, said force measuring means functioning in a manner so that the respective lines interconnecting the first and second mounting points of the linkage arms remain substantially stationary regardless of the magnitude of the force being imparted to the support member whereby a torque of the roller may be calculated from the measured force and the known lever arm.

2. The combination of claim 1 wherein the roller comprises part of a vehicle testing system, the roller being in frictional engagement with and being driven by a driving wheel of the vehicle, the roller having an axle comprising its axis of rotation, and wherein the support member is a transmission assembly being operatively connected to the power absorbing means and to the roller through the axle whereby the torque transmitted from the driving wheel to the roller is measured through the force measuring means.

3. The combination of claim 2 comprising at least two rollers, each roller being driven by a different driving wheel of the vehicle and being connected to the transmission assembly through a respective axle.

4. The combination of claim 1 wherein the force measuring means comprise a load cell.

5. The combination of claim 1 wherein the power absorbing means is operatively connected to the support member through a rotating shaft which is disposed substantially perpendicularly to the axis of rotation of the roller.

6. In a device for measuring the torque of an axle comprising the axis of rotation of a rotating member driven by a prime mover the combination which comprises:
   a stationary frame;
   a support member including at least one roller for engagement with the rotating member and to be driven thereby, the roller being operatively connected to a power absorbing unit, the support member being attached to the stationary frame by at least two linkage arms, each linkage arm having a first pivotable point of attachment to the stationary frame and a second pivotable point of attachment to the support member, the stationary frame, the support member and the linkage arms being relatively positioned so that geometrical lines respectively interconnecting the first and second points of attachment of each linkage arm substantially intersect with the axis of rotation of the rotating member, a force being imparted to the support member when the rotating member rotates the roller, and
   force measuring means connected to the support member and the stationary frame to measure the force imparted to the support member by the rotating member, said force measuring means being adapted for measuring said force while keeping the support member substantially stationary relative to the stationary frame so that from the measured force and a known lever arm of said force relative to the axis of rotation of the rotating member the torque of the rotating axle may be calculated.

7. The combination of claim 6 wherein the rotating member is a driving wheel of a vehicle.

8. The combination of claim 6 wherein there are four linkage arms attaching the support member to the stationary frame, a first two of the four linkage arms being disposed parallel with one another and a second two of the four linkage arms also being disposed parallel with one another.

9. The combination of claim 6 wherein the force measuring means comprise a load cell.

10. In a device for measuring the torque exerted by a rotating inertia wheel of an apparatus for testing prime movers, vehicles and the like, the combination which comprises:
an inertia wheel having an axis of rotation, and being operatively connected with the vehicle to be driven thereby;
a stationary frame to which the inertia wheel is rotatably mounted;
a bracket incorporating brake means for engaging and braking the inertia wheel;
at least two linkage arms, each linkage arm being pivotably attached at a respective first point of attachment to the bracket and at a respective second point of attachment to the stationary frame, lines respectively interconnecting the first and second points of attachment of each linkage arm going through the axis of rotation of the inertia wheel, and
force measuring means connected to the bracket and the stationary frame for measuring a force imparted by the inertia wheel to the bracket when the brake means engage the inertia wheel, said force measuring means being adapted for functioning so as to keep the bracket substantially stationary, the force measured by the force measuring means having a predetermined substantially constant lever arm relative to the axis of rotation of the inertia wheel, whereby the torque exerted by the inertia wheel on the bracket is readily calculated from said force.

11. The combination of claim 10 wherein the force measuring means is a load cell.

12. The combination of claim 10 wherein there are four linkage arms interconnecting the bracket with the stationary frame, first two of said linkage arms being disposed parallel to one another and a second two of said linkage arms also being disposed parallel to one another.

13. In a vehicle testing system the combination which comprises:
a power absorption unit fixedly mounted to a fixed object such as the ground or a stationary frame;
at least one roller operatively connected to the power absorption unit through a transmission assembly and a rotating shaft, the roller being directly supported by the transmission assembly, having an axis of rotation and being adapted for operatively interfacing with a driving wheel of a vehicle whereby the driving wheel of the vehicle rotates the roller and power is transmitted to and absorbed by the power absorption unit;
a stationary frame;
at least two linkage arms, each linkage arm being pivotably connected at a first point of connection to the transmission assembly and at a second point of connection to the stationary frame, the roller, the transmission assembly, the linkage arms and the stationary frame being positioned relative to one another so that geometrical lines respectively interconnecting the first and second points of connection of each linkage arm go through the axis of rotation of the roller, and
force measuring means stationarily connected to the transmission assembly and to the stationary frame for measuring a force exerted upon the transmission assembly when the driving wheel of the vehicle drives the roller, said force attempting to rotate the transmission assembly about the axis of rotation of the roller as a center of rotation, the force measuring means being adapted for keeping the transmission assembly substantially stationary whereby the force acts with a substantially constant lever arm relative to the axis of rotation of the roller and whereby a torque of the driving wheel driving the roller is readily calculated from the measured force.

14. The combination of claim 13 having at least two rollers, the two rollers having colinear axes of rotation, each of the two rollers being connected to the power absorption unit through the transmission assembly and the rotating shaft, being directly supported solely by the transmission assembly and being adapted for operatively interfacing with a respective driving wheel of the vehicle.

15. The combination of claim 14 having at least four linkage arms, a first two of said linkage arm being disposed parallel with one another, and a second two of said linkage arms also being disposed parallel with one another, all linkage arms being positioned so that lines respectively interconnecting the first and second points of connection of each linkage arm go through the colinear axes of rotation of the rollers.

16. The combination of claim 15 further comprising at least a pair of idle rollers, each of said idle rollers being adapted for interfacing with and partially supporting one driving wheel of the vehicle, said idle rollers being rotatably mounted to the stationary frame.

17. The combination of claim 16 comprising two pairs of rollers, the pairs of rollers being positioned behind one another so as to operatively interface with respective tandem driving wheels of a vehicle, each pair of rollers being connected to the power absorption unit through a respective transmission assembly and the rotating shaft, each pair of rollers being directly supported solely by the respective transmission assembly, each pair of rollers having respective colinear axes of rotation, four linkage arms attaching each transmission assembly to the stationary frame, lines interconnecting the respective linkage arms attaching each transmission assembly going through the respective colinear axes of rotation of each pair of rollers, the combination still further comprising a rigid connecting link between the two transmission assemblies whereby the force measured by the force measuring means is a sum of the forces exerted on the rollers by the rotating driving wheels of the vehicle and whereby a total torque output of the driving wheels of the vehicle is calculated from the measured force.

18. The combination of claim 17 wherein the pair of said idle rollers are mounted behind the second of said two pairs of rollers whereby each of the rear pair of the tandem driving wheels of the vehicle is cradled between a idle roller and one roller of said second pair of rollers.

19. The combination of claim 13 wherein the power absorption unit is a hydrokinetic power absorbtion unit.

20. The combination of claim 13 wherein the rotating shaft is disposed substantially perpendicularly to the axis of rotation of the roller.

21. In a vehicle testing system adapted for measuring the torque output of a pair of driving wheels of a vehicle, the combination which comprises:
a stationary frame;
a power absorption unit fixedly mounted to one of the stationary frames and the ground;
a first transmission assembly adapted to be connected to the power absorption unit through a rotating shaft;
a pair of rollers each of the rollers being adapted for frictional engagement with a respective driving wheel of the vehicle and being operatively connected to and supported by the first transmission assembly whereby power developed by the driving wheels of the vehicle may be transferred to and absorbed in the power absorption unit, the rollers respectively having axes of rotation which are colinear with one another;
a first pair of linkage arms, each of the first pair of linkage arms having a first point of attachment wherein the respective linkage arm is pivotably attached to the stationary frame substantially on a first side of the stationary frame and having a second point of attachment wherein the linkage arm is pivotably attached to the transmission assembly substantially on a first side of the transmission assembly, and a second pair of linkage arms, each of the second pair of linkage arms having a first point of attachment wherein the respective linkage arm is pivotably attached to the stationary frame substantially on a second side of stationary frame, and having a second point of attachment wherein the linkage arm is pivotably attached to the transmission assembly substantially on a second side of the transmission assembly, said first and second sides of the stationary frame and of the transmission assembly being located respectively opposite to one another, geometrical lines respectively connecting the first and second points of attachment of each linkage arm substantially intersecting the axes of rotation of the rollers, and
force measuring means stationarily connected to the stationary frame and to the transmission assembly for measuring a force exerted upon the transmission assembly by the rotating driving wheels of the vehicle through the rollers when the driving wheels of the vehicle drive the rollers, said force attempting to rotate the transmission assembly about the colinear axes of rotation of the rollers as a center of rotation, the force measuring means being adapted for keeping the transmission assembly substantially stationary whereby the force acts with a substantially constant lever arm relative to the axes of rotation of the rollers and whereby a torque of the driving wheels driving the rollers is readily calculated from the measured force, the combination being adapted to be assembled in a pit in the ground whereby the vehicle may be readily driven upon the combination with its driving wheels engaging the rollers.

22. The combination of claim 21 further comprising a pair of idle rollers, each of the idle rollers being rotatably mounted to and supported by the stationary frame and located behind a respective roller, each idle roller and the adjacent roller forming cradles adapted for respectively receiving one driving wheel of the vehicle.

23. The combination of claim 21 wherein the rotating shaft is disposed substantially perpendicularly to the colinear axes of rotation of the rollers.

24. In a device for measuring torque the combination which comprises:
an inertia wheel adapted for rotation about an axis, and comprising part of a prime mover testing system and being driven by said prime mover;
a support member relative to which the inertia wheel is rotatably mounted, said support member comprising a bracket and incorporating brake means for frictional engagement with the inertia wheel whereby a force is imparted from the inertia wheel to the support member;
support means for supporting the support member relative to a fixed object such as the ground, said support means including at least two linkage arms connecting the support means to the fixed object, each linkage arm being pivotably mounted to the fixed object at a first point of mounting and being pivotably mounted to the support member at a second point of mounting and disposed in such a manner that a geometrical line drawn between the first and second points of mounting of each linkage arm substantially intersects the axis of rotation of the inertia wheel, and
force measuring means mounted between the support member and the fixed object for measuring the force imparted by the inertia wheel to the support member, said force having a predetermined known lever arm relative to the axis of rotation of the inertia wheel, said force measuring means functioning in a manner so that the respective lines interconnecting the first and second mounting points of the linkage arms remain substantially stationary regardless of the magnitude of the force being imparted to the support member whereby a torque of the inertia wheel acting on the support member may be calculated from the measured force and the known lever arm.

25. In a device for measuring torque the combination which comprises:
a roller comprising part of a vehicle testing system and being adapted for frictional engagement with and to be driven by a driving wheel of the vehicle, the roller having an axle comprising its axis of rotation;
a support member relative to which the roller is rotatably mounted in a relationship wherein the rotating member imparts a force upon the support member;
support means for supporting the support member relative to a fixed object such as the ground, said support means including at least two linkage arms connecting the support means to the fixed object, each linkage arm being pivotably mounted to the fixed object at a first point of mounting and being pivotably mounted to the support member at a second point of mounting and disposed in such a manner that a geometrical line drawn between the first and second points of mounting of each linkage arm substantially intersects the axis of rotation of the roller, the support member including a transmission assembly operatively connected to the roller through the axle and to a power absorbing unit;

an inertia wheel rotatably mounted to the fixed object and being operatively connected to the transmission assembly to be driven by the driving wheel of the vehicle through the roller and the transmission assembly, and force measuring means mounted between the support member and the fixed object for measuring the force imparted by the roller to the support member, said force having a predetermined known lever arm relative to the axis of rotation of the roller, said force measuring means functioning in a manner so that the respective lines interconnecting the first and second mounting points of the linkage arms remain substantially stationary regardless of the magnitude of the force being imparted to the support member whereby a torque of the roller may be calculated from the measured force and the known lever arm, and whereby the calculated torque is substantially a sum of the torques required to drive the inertia wheel rotatably mounted to the fixed object and the power absorbing unit.

26. In a device for measuring the torque of an axle comprising the axis of rotation of a rotating member the combination which comprises:

a stationary frame;

a support member including at least one roller for engagement with the rotating member and to be driven thereby, the roller being operatively connected to a power absorbing unit, through a shaft, said shaft including at least one spline connection, the shaft being located on a line which intersects with the axis of rotation of the rotating member whereby frictional forces arising in the spline connection have a substantially zero lever arm relative to the axis of rotation of the rotating member, the support member being attached to the stationary frame by at least two linkage arms, each linkage arm having a first pivotable point of attachment to the stationary frame and a second pivotable point of attachment to the support member, the stationary frame, the support member and the linkage arms being relatively positioned so that geometrical lines respectively interconnecting the first and second points of attachment of each linkage arm substantially intersect with the axis of rotation of the rotating member, a force being imparted to the support member when the rotating member rotates the roller, and force measuring means connected to the support member and the stationary frame to measure the force imparted to the support member by the rotating member, said force measuring means being adapted for measuring said force while keeping the support member substantially stationary relative to the stationary frame so that from the measured force and a known lever arm of said force relative to the axis of rotation of the rotating member the torque of the rotating axle may be calculated, and whereby frictional forces arising in the spline connection have a substantially zero lever arm relative to the axis of rotation of the rotating member, and therefore have substantially no influence on the measured force.

27. In a vehicle testing system the combination which comprises:

a power absorption unit;

at least one roller operatively connected to the power absorption unit through a transmission assembly and a rotating shaft, the roller being directly supported by the transmission assembly, having an axis of rotation and being adapted for operatively interfacing with a driving wheel of a vehicle whereby the driving wheel of the vehicle rotates the roller and power is transmitted to and absorbed by the power absorption unit;

a spline assembly mounted on the rotating shaft which is disposed so that a line coincident with its longitudinal axis substantially intersects the axis of rotation of the roller;

a stationary frame;

at least two linkage arms, each linkage arm being pivotably connected at a first point of connection to the transmission assembly and at a second point of connection to the stationary frame, the roller, the transmission assembly, the linkage arms and the stationary frame being positioned relative to one another so that geometrical lines respectively interconnecting the first and second points of connection of each linkage arm go through the axis of rotation of the roller, and force measuring means stationarily connected to the transmission assembly and to the stationary frame for measuring a force exerted upon the transmission assembly when the driving wheel of the vehicle drives the roller, said force attempting to rotate the transmission assembly about the axis of rotation of the roller as a center of rotation, the force measuring means being adapted for keeping the transmission assembly substantially stationary whereby the force acts with a substantially constant lever arm relative to the axis of rotation of the roller and the torque of the driving wheel driving the roller is readily calculated from the measured force, and whereby any longitudinal forces arising in the spline assembly have a substantially zero lever arm relative to the axis of rotation of the roller and therefore have no substantial effect on the force measured by the force measuring means.

28. In a vehicle testing system adapted for measuring the torque output of a pair of driving wheels of a vehicle, the combination which comprises:

a stationary frame;

a first transmission assembly adapted to be connected to a power absorption unit through a rotating shaft;

a second transmission assembly operatively connected to the first transmission assembly to transmit rotary power thereto;

a first pair of rollers each of the rollers being adapted for frictional engagement with a respective driving wheel of the vehicle and being operatively connected to and supported by the first transmission assembly whereby power developed by the driving wheels of the vehicle may be transferred to and absorbed in the power absorption unit, the first pair of rollers respectively having axes of rotation which are colinear with one another;

a first pair of linkage arms, each of the first pair of linkage arms having a first point of attachment wherein the respective linkage arm is pivotably attached to the stationary frame substantially on a first side of the stationary frame and having a second point of attachment wherein the linkage arm is pivotably attached to the first transmission assembly substantially on a first side of the first transmission assembly, and a second pair of linkage arms, each of the second pair of linkage arms having a first point of attachment wherein the respective linkage arm is pivotably attached to the stationary frame substantially on a second side of stationary frame, and having a second point of attachment wherein the linkage arm is pivotably attached to the first transmission assembly substantially on a second side of the transmission assembly, said first and second sides of the stationary frame and of the first transmission assembly being located respectively opposite to one another, geometrical lines respectively connecting the first and second points of attachment of each linkage arm substantially intersecting the axes of rotation of the first pair rollers;

a second pair of rollers, each of the second pair of rollers being adapted for frictional engagement with additional driving wheels of the vehicle and being operatively connected to and supported by the second transmission assembly, the second pair of rollers having axes of rotation which are colinear with one another, the second transmission assembly being attached to the stationary frame by a plurality of additional linkage arms, each of the additional linkage arms having a first pivotable point of attachment to the stationary frame and a second pivotable point of attachment to the second transmission assembly, geometrical lines interconnecting the first and second points of attachment of each additional linkage arm intersecting the colinear axes of rotation of the second pair of rollers;

a rigid connecting link between the first and second transmission assemblies whereby a force exerted by the additional driving wheels of the vehicle on the second pair of rollers is transmitted to the first transmission assembly, and force measuring means stationarily connected to the stationary frame and to the transmission assemblies for measuring a force exerted upon the transmission assemblies by the rotating driving wheels of the vehicle through the respective pairs of rollers when the driving wheels of the vehicle drive the rollers, said force attempting to rotate the transmission assemblies about the respective colinear axes of rotation of the respective pairs of rollers as a center of rotation, the force measuring means being adapted for keeping the transmission assemblies substantially stationary whereby the force acts with a substantially constant lever arm relative to the respective axes of rotation of the respective pairs of rollers and whereby a torque of the driving wheels driving the rollers is readily calculated from the measured force, the combination being adapted to be assembled in a pit in the ground whereby the vehicle may be readily driven upon the combination with its driving wheels engaging the respective pairs of rollers.

29. The combination of claim 28 wherein there are four additional linkage arms.

30. The combination of claim 29 wherein the force measuring means is a load cell.

* * * * *